Patented July 26, 1927.

1,637,068

UNITED STATES PATENT OFFICE.

WALTER W. WILLISON, OF BROOKLYN, NEW YORK, ASSIGNOR TO THERMOKEPT CORPORATION, OF NEW YORK, N. Y., A CORPORATION OF DELAWARE.

PROCESS OF TREATING FOOD PRODUCTS.

No Drawing.     Application filed February 2, 1924. Serial No. 690,297.

This invention relates to a mode of treatment whereby certain food products are prepared and made more palatable and digestible and whereby said products are preserved against deterioration for future use. My process is admirably adapted for the treatment of food compounds containing a high percentage of starch, as well as for those products rich in other compounds, as nitrogenous materials and nutritious oils. As examples of the former group may be cited rice, macaroni, spaghetti, oatmeals and cereals, or other like food compounds; among the latter are included almonds, cocoanut meats, beans, peas, peanuts, and nut meats generally.

It is well known that the former group, that is, those food compounds wherein the starch content predominates, requires special preparation by cooking or the application of heat, to convert the starch; while the latter group, or those foods rich in proteins and oils, requires special treatment to convert the starch and at the same time prevent the oils from breaking down and to retain their delicate flavors, or to produce a particular flavor. In any case, it is important to exclude air and oxygen, or any of the various injurious micro-organisms, in order to preserve the prepared food compound.

I have discovered a mode of treatment whereby, in the preparation of the food compound to properly convert the starch content, I utilize a portion of the converted or hydrolyzed starch to serve as a protective agent and to thereby preserve the oil cells from breaking down, and whereby the more delicate natural flavors are retained or are even properly developed, and while the various food compounds require minor refinements or variations in the mode of treatment, depending largely upon the constituents of the foods under treatment, the essential steps of my process remain unchanged and may be stated as follows:—

The prepared and cleaned raw product is subjected to a high vacuum in a suitable container. This may be a large tank, if nuts or nut meats are to be treated, or the container may be the can in which the product is treated, sealed and sold, as in the case for prepared cereals, rice, peas, beans, spaghetti, macaroni, and the like. After proper vacuumization has been established, which is approximately between 28 and 30 inches, a suitable liquid is admitted without breaking the vacuum. The liquid used depends upon the food treated and varies greatly, but in all cases is it sufficient to submerge the product. Vacuumization is maintained until agitation ceases. The vacuum is then broken, thereby causing the liquid to penetrate or completely saturate and surround the cell structure.

As suitable liquids, the following examples may be cited: Where peanuts, or almonds, and the like, are to be treated, for the salted product, I utilize a saturated brine solution; for rice and cereals, pure water, salted to taste or not, is generally used; for macaroni, spaghetti or beans and the like, a suitable sauce is used. These liquids may obviously be varied to meet the various food compounds treated, or they are varied in accordance with the final product required, without departing from the spirit and scope of my invention as herein described and claimed. And the temperature at which the liquid is kept must not, for the best results, exceed 100° F. At a temperature of approximately 100° F. the liquid exerts a dissolving action on the starch, while at the same time it is not hot enough to act destructively upon the more delicate flavors and the oil cells.

The product is now heated to 212° F., or above and this temperature is maintained until all the starch in the product is hydrolyzed. This may be accomplished in an open kettle or in the sealed container. In the case of rice, oatmeal, macaroni, spaghetti and the like, the heating is advantageously accomplished after the containers are sealed, whereby the single heating accomplishes sterilization as well as the cooking of the product. By thus treating and cooking these foods a very smooth and uniform product is produced, which has a most excellent flavor. The sealing is preferably done in vacuo. Where nuts and nut meats are treated, the heating is accomplished in an open kettle or by dipping in heated edible oils, as will be more fully stated hereinafter.

In carrying out my process commercially for the starchy food products, weighed quantities are placed in the containers wherein the product is treated, sealed and sold, and subjected to the vacuum treatment. For the dry cereals it may be necessary to moisten the same before being subjected to vacuumization. The filling may be done by hand, or it may be accomplished by a suitable filler at the filling station. The filled open cans are then caused to be fed uninterruptedly and in a continuous stream into a vacuumizing chamber, to be there subjected to vacuumization. The proper amount of liquid (sauce, or water, as the case may require), is supplied to the containers while vacuumization is maintained. The vacuum is now broken and the food in the open containers is exposed to atmospheric pressure to permit the sauce, or other liquid, to penetrate the food compound. In practice, this is accomplished while the open containers, with their vacuumized contents, pass from the vacuumizing chamber to the sealing station or machine, where sealing and cooking or sterilization are effected.

The product thus treated and sealed is found to retain its most delicate flavor, to be free from glutinous or lumpy masses, and to have a most desirable uniform texture. Moreover, foods thus prepared and sealed are ready to serve at a moment's notice by merely heating.

Where the salted product is desired, as salted peanuts or salted almonds, the brine is withdrawn from the nut kernels after they are impregnated to the desired degree. The degree of saltiness is readily controlled by varying the density of the brine and time of treatment. This step is accomplished most effectively by establishing a vacuum and breaking the same while the kernels are completely submerged, in the manner stated above for the starchy foods. The nuts or nut kernels are next ready for the heating step, in order to hydrolyze the starch content. This step is readily accomplished by submerging the brine-saturated nuts in boiling edible oil, which may be conveniently done in an open kettle. The starch first swells when subjected to the hot oil, and then it contracts as the water is driven off, thus causing a part of the hydrolyzed starch to form a hard film about the oil cells to thus protect them from the injurious effects of the air and other agencies. When the kernels are fried sufficiently, they are removed from the frying oil and allowed to cool. They are now packed in open packages, or in containers which may be sealed in vacuo, if so desired.

Nut meats thus treated, and in particular peanuts and almonds, are crisp, compact and have a pleasing salty flavor, the intensity of which depends upon the density of the brine and time of exposure. They further retain their sweetness and crispness for a long time, even in the open. This is probably due to the fact that salt exerts a preserving action and its presence, together with the protective coating due to the hydrolyzed starch, prevents the oil cells from breaking down and becoming rancid. It is further noted that the hydrolyzed starch is no longer hydroscopic and hence the nut will not absorb moisture and become soggy. Obviously, the treated and prepared nut meats may be sealed in vacuo, if desired, or they are sold in paper packages.

Having now described my invention, what I claim as new and useful, of my own invention, and desire to secure by Letters Patent, is:—

1. The method of preparing food products which comprises subjecting the selected food product to a high degree of vacuumization and while so subjected supplying liquid to immerse said food product, then breaking said vacuum to cause the liquid to penetrate and surround the cell structure of the food product, and thereafter subjecting said liquid filled product to a high temperature for conversion of the starch content.

2. The method of preparing food products which comprises subjecting the selected food product to a high degree of vacuumization and while so subjected supplying liquid at a temperature of approximately 100° F. to completely immerse said food product, maintaining said vacuumization until the occluded gases are removed and the immersed mass becomes quiescent, then breaking said vacuumization and allowing the liquid to penetrate the food product, finally heating the liquid filled food product at or about 212° F., and maintaining said temperature until the starch content has been converted and unified.

3. The method of preparing food products which comprises subjecting the selected food product to a high degree of vacuumization and while so subjected supplying liquid at a temperature of about 100° F. to hydrolyze the starch and completely immersing said food product in the liquid, maintaining said vacuumization until the occluded gases are removed and the immersed mass becomes quiescent, then breaking said vacuumization and allowing the liquid to penetrate the food product, finally sealing said food product in containers and heating said containers and contents to a sterilizing temperature.

4. The method of preparing food products which comprises subjecting the selected food product to a high degree of vacuumization, then supplying said product with a liquid at about 100° F. to enable said liquid to act on said product while vacuumization is maintained, thereafter causing said liquid to penetrate the food product by sudden increase of pressure, then vacuum sealing said product, and heating said sealed product above 212° F.

5. A food product consisting of a vacuum treated starchy food compound wherein the starch has been hydrolyzed, the air removed from the food product and the product self-sealed by a portion of the starch.

In testimony whereof I have hereunto set my hand on this 23rd day of January A. D., 1924.

WALTER W. WILLISON.